United States Patent Office.

SAMUEL K. WELLMAN, OF NASHUA, NEW HAMPSHIRE.

Letters Patent No. 64,389, dated April 30, 1867.

---

IMPROVEMENT IN THE MANUFACTURE OF FIRE-BRICK.

---

The Schedule referred to in these Letters Patent and making part of the same.

---

KNOW ALL MEN BY THESE PRESENTS:

That I, SAMUEL K. WELLMAN, of Nashua, in the county of Hillsborough, and State of New Hampshire, have invented certain new and useful improvements in Fire-Bricks; and I do hereby declare that the following is a full, clear, and exact description thereof.

To enable those skilled in the art to which my invention belongs to make and use it, I will proceed to describe the same.

The nature of my invention consists in combining "diamond rock," after it has been properly crushed, with fire-clay, or fire-clay and sand. One good way of carrying out my invention is as follows:

Take, say "diamond rock," fine and coarse mixed, thirty-five per cent.; fire-sand, fifteen per cent.; fire-clay, fifty per cent.; said materials being mixed, moulded, and burnt in the usual manner. For some purposes a good fire-brick may be made from, fire-clay, fifty per cent.; "diamond rock," coarsely crushed, fifty per cent.; the latter being crushed, say, to the size of kernels of wheat or corn.

The use of "diamond rock," with other suitable materials, in the manufacture of fire-brick, furnace-linings, and other articles designed to resist great heat, renders such articles far superior to those articles as heretofore made, since they resist the heat better, do not scale off so readily, and, besides, can be afforded at a very reasonable price as compared with those manufactured in the old or ordinary manner.

Having thus described my improvements in the manufacture of fire-bricks, what I claim therein as new and of my invention, and desire to secure by Letters Patent, is—

The use of "diamond rock" in the manufacture of fire-bricks, furnace-linings, and similar articles, substantially as described.

SAM. K. WELLMAN.

Witnesses:
F. MUNROE,
S. T. WELLMAN.